(12) United States Patent
Bergmann

(10) Patent No.: US 7,609,098 B2
(45) Date of Patent: Oct. 27, 2009

(54) DRIVER CIRCUIT FOR ELECTRONIC COMPONENTS

(75) Inventor: Guenther Bergmann, Blaustein (DE)

(73) Assignee: Atmel Automotive GmbH, Heilbronn (DE)

( * ) Notice: Subject to any disclaimer, the term of this patent is extended or adjusted under 35 U.S.C. 154(b) by 0 days.

(21) Appl. No.: 11/418,205

(22) Filed: May 5, 2006

(65) Prior Publication Data

US 2006/0255838 A1 Nov. 16, 2006

(30) Foreign Application Priority Data

May 10, 2005 (DE) ........................ 10 2005 022 612

(51) Int. Cl.
 *H03B 1/00* (2006.01)
(52) U.S. Cl. .................... 327/108; 326/89; 372/29.015; 372/38.07; 315/291; 345/82
(58) Field of Classification Search ................. 327/108, 327/109, 112; 326/82, 83, 89; 372/29.1, 372/29.011–29.013, 29.015, 38.1, 38.01–38.05, 372/38.07–38.09; 315/291, 297, 305; 345/82, 345/83
See application file for complete search history.

(56) References Cited

U.S. PATENT DOCUMENTS

| | | | | |
|---|---|---|---|---|
| 5,736,844 A | * | 4/1998 | Yanagisawa | ................. 323/282 |
| 5,848,044 A | | 12/1998 | Taguchi et al. | |
| 6,229,833 B1 | * | 5/2001 | Noda et al. | .............. 372/38.09 |
| 6,345,062 B1 | | 2/2002 | Taguchi et al. | |
| 6,580,735 B1 | * | 6/2003 | Theodoras, II | ............ 372/38.02 |
| 6,628,252 B2 | * | 9/2003 | Hoshino et al. | ................ 345/82 |
| 6,867,644 B2 | * | 3/2005 | Taubman | ..................... 327/563 |
| 6,901,091 B2 | * | 5/2005 | Schrodinger | ................. 372/26 |
| 6,956,408 B2 | * | 10/2005 | Schrodinger et al. | .......... 327/66 |
| 6,980,181 B2 | * | 12/2005 | Sudo | ............................ 345/82 |
| 6,982,527 B2 | * | 1/2006 | Lee et al. | ..................... 315/224 |
| 7,209,502 B2 | * | 4/2007 | Brosnan | ....................... 372/28 |
| 7,345,513 B2 | * | 3/2008 | Gropper et al. | ............. 327/108 |
| 2005/0073268 A1 | | 4/2005 | Schrodinger et al. | |
| 2005/0094690 A1 | * | 5/2005 | Kubota | .................... 372/38.02 |
| 2006/0114036 A1 | * | 6/2006 | Gropper et al. | ............. 327/108 |
| 2006/0187982 A1 | * | 8/2006 | Knotz | ..................... 372/38.02 |

* cited by examiner

*Primary Examiner*—Lincoln Donovan
*Assistant Examiner*—Patrick O'Neill
(74) *Attorney, Agent, or Firm*—Muncy, Geissler, Olds & Lowe, PLLC

(57) ABSTRACT

A driver circuit including an amplifier, which generates a control signal from a reference signal; a driver current mirror; and a control current switch located between the amplifier and the driver current mirror which selectably isolates the driver current mirror from the amplifier or connects the driver current mirror to the amplifier, wherein the driver current mirror, when in a state connected to the amplifier, amplifies the control signal into a driver signal. A compensating circuit is provided that generates a correction signal, as a function of an error current of the driver current mirror and provides the correction signal to an input of the amplifier, wherein a feedback signal input of the amplifier is fed through a feedback path from a feedback signal coupled out of a control branch of the driver current mirror, and the compensating circuit additively provides the correction signal at an input of the amplifier.

15 Claims, 5 Drawing Sheets

DRIVER CIRCUIT FOR ELECTRONIC COMPONENTS

This nonprovisional application claims priority under 35 U.S.C. § 119(a) on German Patent Application No. DE 102005022612, which was filed in Germany on May 10, 2005, and which is herein incorporated by reference.

BACKGROUND OF THE INVENTION

1. Field of the Invention

The present invention relates to a driver circuit for electronic components, with an amplifier and a control current transistor, which generate a control signal from a reference signal, with a driver current mirror, and with a control current switch, which is located between the amplifier and the driver current mirror and which selectably isolates the driver current mirror from the control current transistor or connects the driver current mirror to the driver current transistor, wherein the driver current mirror, when in a state connected to the control current transistor, amplifies the control signal into a driver signal.

2. Description of the Background Art

Driver circuits are used, for example, for driving laser diodes. In simple conventional driver circuits, the control current is stabilized by a negative feedback in which a feedback signal input of an amplifier is supplied through feedback with a feedback signal coupled out of a control branch of the driver current mirror.

In driving an electronic component, a driver current serving as a driver signal should be settable by a reference current with which the amplifier is modulated. In this context, the gain of the amplifier circuit, in other words the quotient of the driver current and the reference current, and also the value of the reference current, should be as independent as possible of the value of the driver current and the temperature of the components involved, and should also be as consistent as possible when components to be driven and driver circuits are produced in large quantities.

The gain of the amplification for laser diode drivers for current CD/DVD drives is approximately 1 MHz. On account of this relatively low bandwidth, the driver current, which must be switched in the sub-nanosecond range, cannot be accomplished through corresponding pulse control of the reference current. Rather, the keying is accomplished by enable signals which, with the aid of the aforementioned control signal switch, selectably feed the control current immediately ahead of the driver current mirror serving as an output stage into either the driver current mirror or into other circuit components.

The desired current conversion ratio between the driver current and the control current of the control current mirror is typically in the range between 5 and 20. A high conversion ratio is desirable for reasons of low current consumption. A rather lower conversion ratio is preferred from the standpoint of the fastest possible switching speed.

Current mirrors are implemented using transistors. It is known that the current gain beta of bipolar transistors, which is the quotient of the collector current IC and base current IB, is subject to relatively large dispersion (for example, between 30 and 100) in the large-quantity production of integrated circuits. Moreover, the current gain is dependent on the collector current. The aforementioned dispersions carry through to the characteristics of the driver current mirror, so that its gain, which is defined here to mean the quotient of the driver current and control current, has dispersion, with the result that the overall gain of the driver circuit likewise exhibits the undesirable dispersions.

A conventional driver circuit, which is illustrated in FIG. 6, compensates for dispersions using a compensating circuit that has a current mirror, which is hereinafter referred to as the compensating current mirror to distinguish it from the driver current mirror. The compensating current mirror is always connected to the amplifier. The feedback that stabilizes the amplifier is connected to a control branch of the compensating current mirror. This distinguishes the aforementioned known driver circuit with compensating current mirror from the likewise known simple driver circuit whose feedback is supplied from the control branch of the driver current mirror.

Compensation, according to the conventional art, is based on the fact that the compensating current mirror coupled to the feedback of the amplifier is largely as identical as possible to the driver current mirror, and in particular has the same effective current gain. As is discussed in greater detail below, the gain of the overall arrangement can then be set by dimensioning certain resistances. The matching of their characteristics is inherently good in a monolithic integration of the circuit, in contrast to the characteristics of the transistors.

However, the conventional art compensation requires a comparatively large amount of current, it produces an additional noise contribution, and the current mirror error of the compensating current mirror caused by production tolerances enters directly into the amount of the gain. It is critical in particular that increasingly stringent requirements for low noise levels in the driver current cannot be met with the prior art compensating circuit.

SUMMARY OF THE INVENTION

It is therefore an object of the present invention to provide a driver circuit that requires less current and, in particular, has an improved signal-to-noise ratio.

This object is attained in a driver circuit of the aforementioned type in that a compensating circuit is located between an input of a control current transistor and an input of an amplifier, generates a correction signal, and additively feeds the correction signal into an input of the amplifier.

In this way, a fundamentally different approach to compensating the error current of a driver current mirror is proposed. In contrast to the aforementioned simple driver circuits, the invention permits compensation of the error current and thus of a current conversion error of the driver current mirror. In contrast to the additional conventional art driver circuit, which also has a compensating circuit, the correction signal in the invention is fed in additively, so that the compensating circuit used within the scope of the invention need only generate an additive offset for the compensation. By contrast, in the conventional compensating circuit, the formation of an inherently corrected feedback signal takes place in the compensating current mirror, which therefore must carry the full feedback current, while the control current that in any case flows in the driver current mirror is not used for feedback. In comparison with this, the additive correction signal produced within the scope of the invention represents only a small amount. This reduces both the current consumption of the inventive driver circuit and the noise as well, since errors and disturbances (noise) in the additive correction signal are also small and thus act only in reduced form on the control loop, which is closed by the feedback.

With regard to embodiments of the driver circuit according to the present invention, a feedback signal input of the amplifier can be fed through a feedback path from a feedback signal coupled out of a control branch of the driver current mirror.

As a result, the current that in any case flows in the control branch is also used for the feedback. In contrast thereto, in the conventional driver circuit the feedback is supplied from the compensating current mirror, which thus must generate not only the correction signal but also the feedback signal, resulting in the aforementioned disadvantages.

Also, the compensating circuit can have a resistor located between the output of the control current transistor and a feed-in of the correction signal.

As a result of this resistance, a potential at a feed-in point of the correction signal is reduced, allowing the feed-in to be free of interference.

Further, the compensating circuit can produce the correction signal as a function of an error current of the driver current mirror.

This feature permits formation of the correction signal that appropriately compensates a current conversion error of the driver current mirror.

The driver current mirror can have a control branch with a first transistor and a first emitter resistor, and also to have a driver branch with a second transistor and a second emitter resistor, wherein the value of the second resistor corresponds to 1/GD times the value of the first emitter resistor, and an emitter area of the second transistor corresponds to GD times the emitter area of the first transistor.

This scaling of the emitter areas ensures that equal emitter current densities are present in the first transistor and the second transistor. The scaling of the aforementioned emitter resistors then results in equal voltage drops across these emitter resistors. As a desirable consequence, an effective current conversion factor Gdeff is established that is largely independent of temperature and collector current, but that still differs from the desired value GD.

In a further embodiment, the compensating circuit can have a proportional branch with a third transistor, a fourth transistor, and also a third emitter resistor of a third transistor and a fourth emitter resistor of a fourth transistor, wherein the third transistor can be controlled by the output of the amplifier.

As a result of this embodiment, a current that is proportional to (but smaller than) the control current through the control branch of the driver current mirror is produced in the proportional branch as a base value for producing a correction signal.

An emitter area of the third transistor can be equal to a quotient of the emitter area of the control current transistor in a numerator and the proportionality factor in a denominator, and a value of the third emitter resistor can be equal to GC times the emitter resistor of the control current transistor.

As a result of these features, the current in the proportional branch is reduced to 1/GC times the current through the control branch, contributing to a reduced current consumption of the driver circuit.

The fourth transistor can have the same conductivity type as the first transistor in the control branch of the driver current mirror and can be dimensioned such that its emitter current density corresponds to the emitter current density of the first transistor.

This embodiment ensures that the base current of the fourth transistor is directly proportional to the error current dI arising in the driver current mirror, permitting an indirect detection of the error current.

Also, the correction signal can be produced by a controllable current source that is controlled by a base current of the fourth transistor.

The current error of the driver current mirror is reflected in the base current of the fourth transistor. Thus, controlling the current source with this base current results in a correction signal that depends on the current error in the desired manner.

Another embodiment provides that the correction signal is produced by a correction current mirror of a transistor diode and at least one additional transistor.

Production of the correction signal by a correction current mirror permits scaling of the correction signal through a variation in the number of current branches of the current mirror.

The correction signal can be provided through an additive combination of the correction signal with the feedback signal. Alternatively, it is preferred for the correction signal to be provided through an additive combination of the correction signal with the reference signal.

In this regard, only a superposition/addition taking place with the correct arithmetic sign needs to be taken into account. The degrees of freedom in circuit design are increased by the alternative options for combination.

Also, the correction current mirror can scale a current coupled out of a base of the fourth transistor by a factor L and can superimpose the current multiplied by L on a feedback signal at a node in the feedback path as a correction signal.

The current coupled out is directly proportional to the error current of the driver current mirror, so that this embodiment provides a correction signal proportional to this error current.

An example application of the aforementioned driver circuits can be to drive a laser diode from its anode side (high side control), as is generally the case for present-day laser diodes. An alternative application is to drive a laser diode from its cathode side (low side control). These alternatives demonstrate the wide applicability of the driver circuit presented here, which in general is not restricted to driver circuits for laser diodes, but also includes other electronic components as well.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
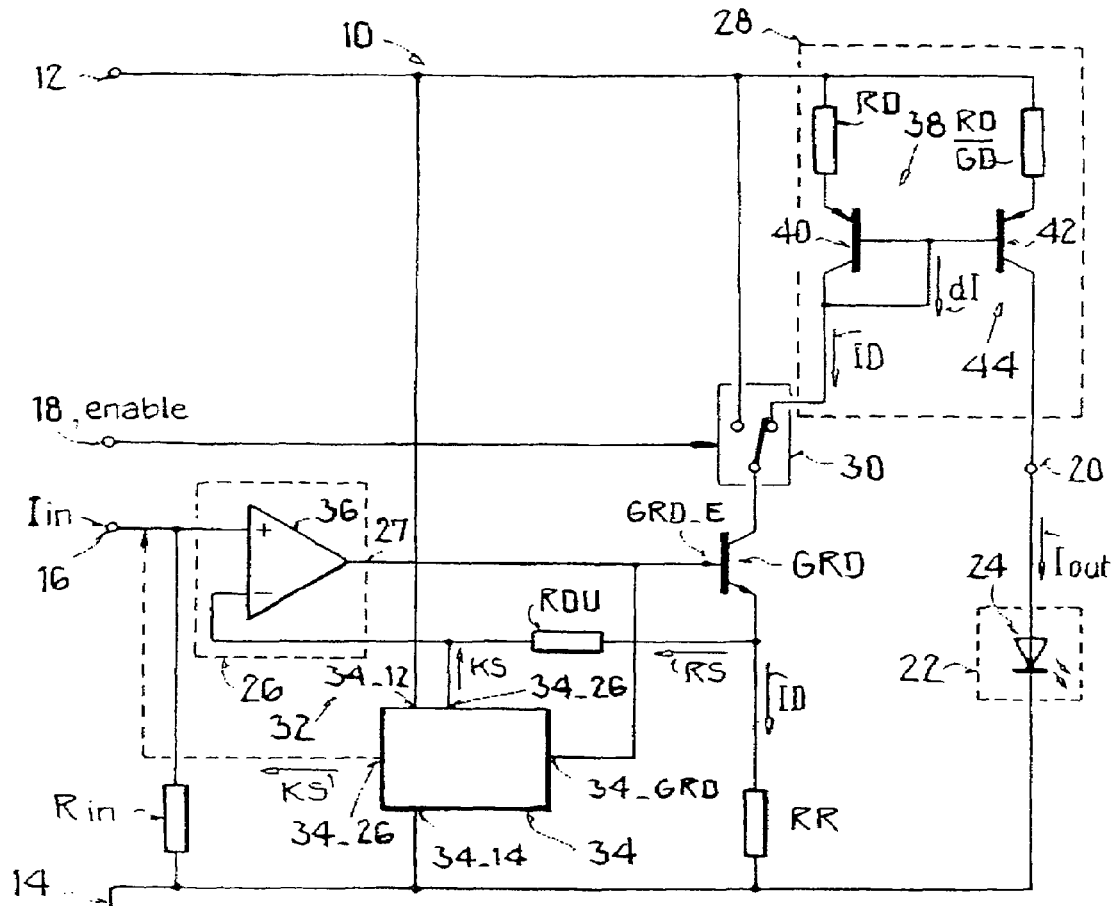
FIG. 1 illustrates a first example embodiment of a driver circuit with a compensating circuit arranged according to an embodiment of the invention.

FIG. 1 shows a driver circuit 10 that is electrically connected between a supply voltage connection 12 and a reference voltage connection 14. The driver circuit 10 has a reference signal input 16, an enable signal input 18 and an output 20. An electronic component 22 is connected to the output 20. In this embodiment, the electronic component 22 is a laser diode 24 of a CD/DVD device, which is operated with a driver current Iout.

In such an application, a time behavior of the driver current Iout has pulses of variable height and width. To generate such pulse shapes, the driver circuit 10 has an amplifier 26, a driver current mirror 28 and a control signal switch 30. A feedback path 32 serves to increase the bandwidth of the amplifier 26 and to stabilize its output signal. In addition, the driver circuit 10 has a control current transistor GRD, whose conductivity path, together with an emitter resistor RR, is connected in series between the reference voltage 14 and the control signal switch 30, and also has a reference signal resistor Rin.

A compensating circuit 34 is connected between an input GRD_E of the control current transistor GRD and an input of the amplifier 26. To this end, an input 34_GRD of the compensating circuit 34 is connected to the input GRD_E, and an output 34_26 is connected to an input of the amplifier 26. In every case, the compensating circuit 34 produces a correction signal KS or KS¹, and additively provides it at an input of the amplifier 26. In this context, the provision can take place by combining the correction signal KS with a feedback signal RS (solid-line connection between 34 and 32), or by combining a correction signal KS¹, with reversed polarity, with the reference signal (dashed connection). In addition, the compensating circuit 34 is connected to the supply voltage connection 12 through a connection 34_12, and to the reference voltage connection 14 through a connection 34_14.

The invention is described below with emphasis on the embodiment wherein the correction signal KS is additively fed into the feedback signal input of the amplifier 26. In this case a resistor RDU serves to create a voltage difference between the input GRD_E and an output of the control current transistor GRD, making it easier to feed in the correction signal KS between the resistor RDU and the feedback signal input of the amplifier 26. To set the pulse heights in the driver signal Iout, the amplifier 26 is modulated through its reference signal input with a reference current Iin. The amplifier 26 can, for example, be implemented as an operational amplifier 36 with a non-inverting input "+", an inverting input "−", and the output 27. In this case the reference signal Iin, or a voltage produced from the reference current Iin by the reference signal resistor Rin, is fed to the non-inverting input of the operational amplifier 36, while its inverting input is connected to the feedback path 32. The control current transistor GRD is modulated via the output 27 of the operational amplifier 36, so that a control current ID is produced in its conductivity path.

Via the control current switch 30, the control current ID is alternatively fed into either the supply voltage connection 12 or a control branch 38 of the driver current mirror 28. The control current switch 30 is operated by an enable signal through the enable signal input 18. In this regard, the control current switch 30 occupies the switching state shown for a time period predefined. in each case by the enable signal, corresponding to a pulse width in the driver signal Iout. The control current ID that flows through the control branch 38 in this switching state is transferred by the first and second transistors 40 and 42 of the driver current mirror 28, which are provided with first and second emitter resistors RD and RD/GD, into the driver branch 44 of said driver current mirror as an amplified driver current Iout. The conversion ratio between Iout and the control current ID here is predefined by the dimensioning of the resistors RD, RD/GD and the emitter areas of the transistors 40, 42 (see also FIG. 2).

In this regard, the labeling of the first and second emitter resistors RD and the RD/GD values reflect an embodiment for achieving a desired conversion ratio GD. Analogously, the emitter area of the second transistor 42 corresponds to GD times the emitter area of the first transistor 40. This scaling of the emitter areas ensures that equal emitter current densities are present in the first and second transistors 40 and 42. The scaling of the first and second emitter resistors RD, RD/GD then also results in equal voltage drops across these emitter resistors RD, RD/GD. As a desirable consequence, a current conversion factor GDeff is established that is largely independent of temperature and collector current, but that still differs from the desired value GD.

The undesirable deviation results from an unavoidable error current dI of the driver current mirror 28. The error current dI depends in turn on the current gain of the transistors 40, 42, on the driver signal Iout provided as collector current, and on the desired conversion ratio GD. If pnp transistors 40, 42 are used, the current gain is also labeled as Bpnp, and the error current dI is calculated using these labels as:

$$dI = \frac{Iout}{Bpnp} \cdot \left(1 + \frac{1}{GD}\right)$$

As has already been mentioned, the current gain Bpnp is subject to relatively large dispersion (for example, between 30 and 100) in the production of integrated circuits. This has the result that the effective current conversion factor GDeff of the driver current mirror 28 also has dispersions that are reflected in the pulse heights of the driver current Iout.

Figure 2:
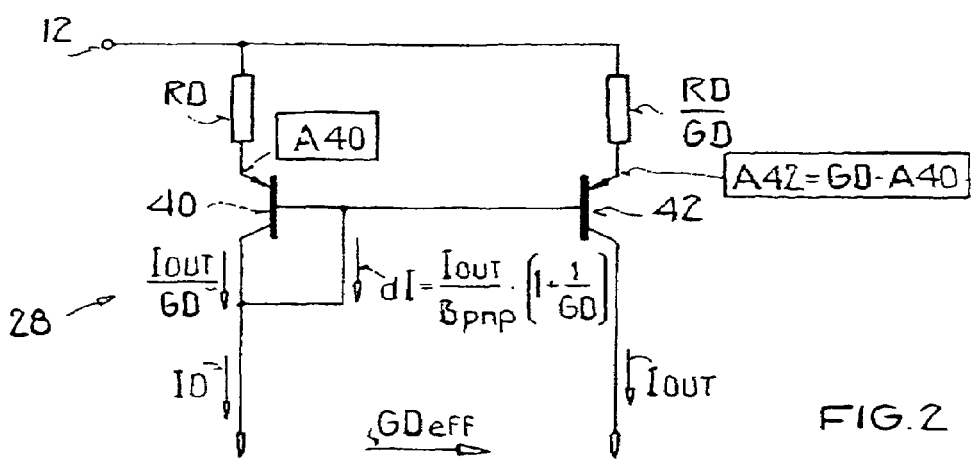
FIG. 2 shows a current budget of a driver current mirror from the driver circuit in FIG. 1.

FIG. 2 shows a current budget of the current mirror 28. Here, the quantities A40 and A42 represent the emitter areas of the transistors 40 and 42. The relationship between the control current ID and the driver current Iout can be read off from the current budget shown in FIG. 2:

$$ID = \frac{Iout}{GD} \cdot \left(1 + \frac{GD}{Bpnp} + \frac{1}{Bpnp}\right), \text{ or}$$

$$Iout = GDeff \cdot ID, \text{ where}$$

$$GDeff = \frac{GD}{1 + \frac{GD}{Bpnp} + \frac{1}{Bpnp}}$$

In particular, GDeff, the effective current gain, is thus always less than the desired current gain GD.

Figure 3:
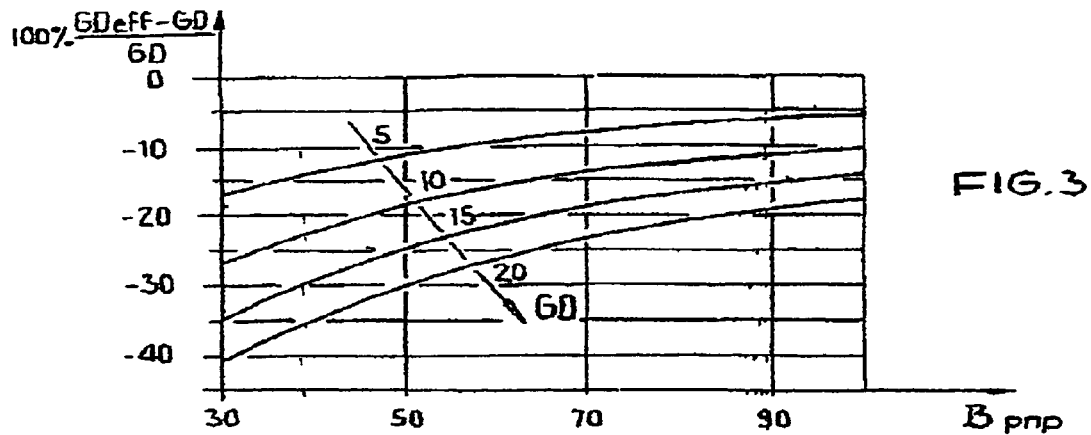
FIG. 3 illustrates a characteristic curves in qualitative form of a deviation of an actual current gain Gdeff from a desired current gain GD over a transistor current gain for the driver current mirror from the driver circuit in FIG. 1.

FIG. 3 shows characteristic curves of a deviation in % of an actual current gain Gdeff from a desired current gain GD over a transistor current gain Bpnp for the driver current mirror 28 from the driver circuit in FIG. 1.

In the present invention, the error current dI, which depends on the dispersing current gain Bpnp, is compensated by the compensating circuit 34, which additively provides the correction signal to an input of the amplifier. A correction signal produced by the compensating circuit 34 thus supplies only a comparatively small contribution to the feed-back signal. Errors and disturbances (noise) in producing the correction signal in the compensating circuit 34 thus enter into the feedback signal only at a correspondingly reduced order of magnitude, and thus represent only a correspondingly small disturbance in the control loop of the amplifier 26.

Figure 4:
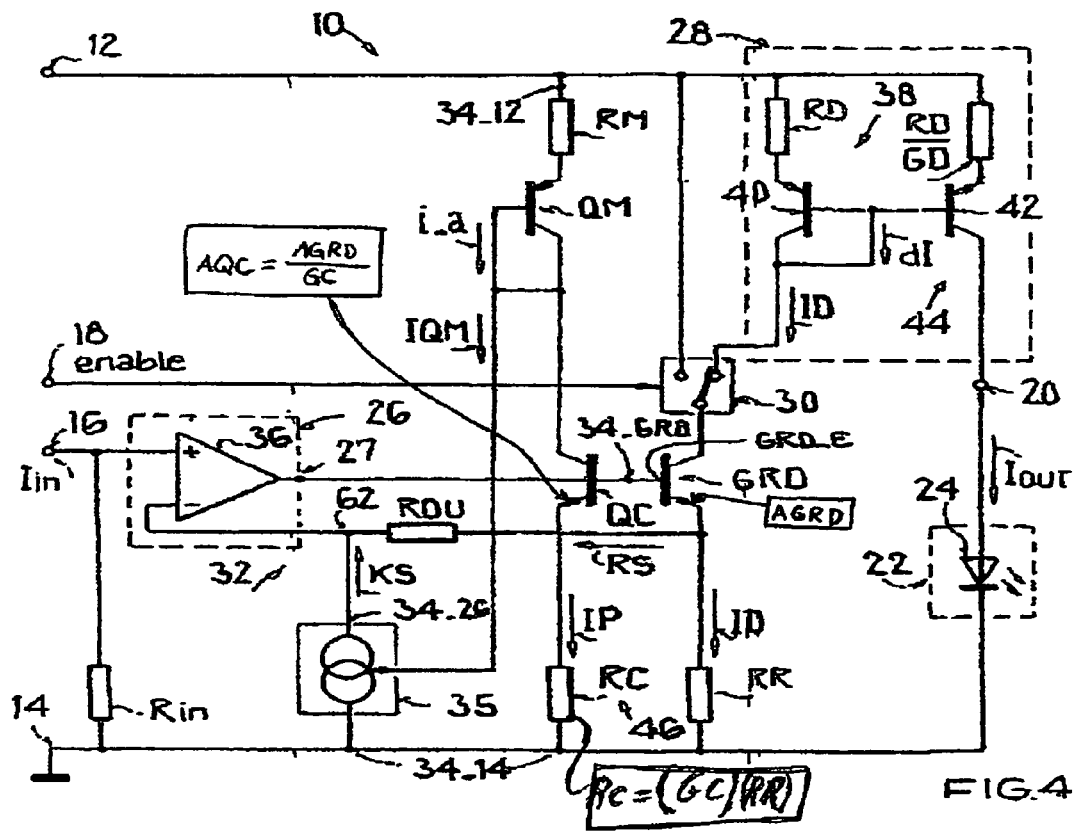
FIG. 4 illustrates the driver circuit from FIG. 1 with a concrete circuit embodiment of a compensating circuit.

FIG. 4 shows the driver circuit 10 from FIG. 1 with a concrete circuit embodiment of a compensating circuit 34, whereby the compensating circuit comprises the elements RM, QM, QC, RC, and 35, which are connected between its connections 34_12, 34_14, 34_GRD and 34_26. This compensating circuit 34 has a proportional branch 46 with a third transistor QC, a fourth transistor QM, a third emitter resistor RC of the third transistor QC, and a fourth emitter resistor RM of the fourth transistor QM.

The third transistor QC, like the control current transistor GRD, is controlled by the output 27 of the amplifier 26. Thus, the current IP flowing in the proportional branch 46 is proportional to the control current ID through the control branch 38 of the driver current mirror 28. In order to achieve the proportionality:

$$IP = \frac{1}{GC} \cdot ID.$$

The third transistor QC is dimensioned such that its emitter area AQC is substantially equal to the quotient of the emitter area AGRD of the control current transistor GRD in the numerator and the proportionality factor GC in the denominator. Analogously, the third emitter resistor RC should be dimensioned such that its value is substantially equal to GC times the emitter resistor RR.

The fourth transistor QM is of the same conductivity type as the first transistor 40 in the control branch 38 of the driver current mirror 28 and is dimensioned such that its emitter current density corresponds to the emitter current density of the first transistor 40. In production of the driver circuit 10 as an integrated circuit, its gain Bpnp then also exhibits dispersions. However, these production-related dispersions generally only arise from circuit to circuit, and not within an individual circuit. In production of the driver circuit 10 as an integrated circuit, the first transistor 40 is manufactured together with the fourth transistor QM in a single process, so that both transistors 40, QM exhibit substantially equal variations in their current gain Bpnp. Since both transistors QM and 40 are connected as transistor diodes with a substantially equal emitter current density, the base current i_a of the fourth transistor QM is directly proportional to the error current dI arising in the driver current mirror 28.

In FIG. 4, this base current i_a is used to control a controllable current source 35, which then produces a correction signal KS that depends on the current gain Bpnp of the transistors 40, 42 of the driver current mirror 28. The base current or fraction IQM of the base current i_a of the fourth transistor QM acting as a control signal of the current source is thus given, with a factor K, by $$IQM = K \cdot \frac{ID}{GC \cdot Bpnp}$$

The factor K depends on how the control signal IQM is coupled out of the base current i_a.

Under the condition that the current source 35 scales its control signal with a factor L, it draws L times the current IQM out of a node 62 in the feedback path 32, which corresponds to an additive combination/superposition (of a negative quantity). Via a resistor RDU located in the feedback path 32, the L-th multiple of the control signal coupled out of the base current gives rise to a corresponding correction voltage dU, to which the following applies:

$$dU = L \cdot i\_a \cdot RDU = L \cdot K \cdot \frac{RDU \cdot ID}{GC \cdot Bpnp} = L \cdot K \frac{RC \cdot RDU \cdot ID}{RR \cdot Bpnp}$$

Through the feedback path 32, this dU gives rise to an additional control current dzI as a correction to the control current ID, which can be calculated as follows:

$$dzI = L \cdot K \frac{RC \cdot RDU \cdot ID}{RR \cdot RR \cdot Bpnp}$$

By choosing the factors L, K, it is possible to set dzI such that precisely the error current dI missing in the driver current mirror 28 is produced, so that this error current dI is compensated.

Figure 5:
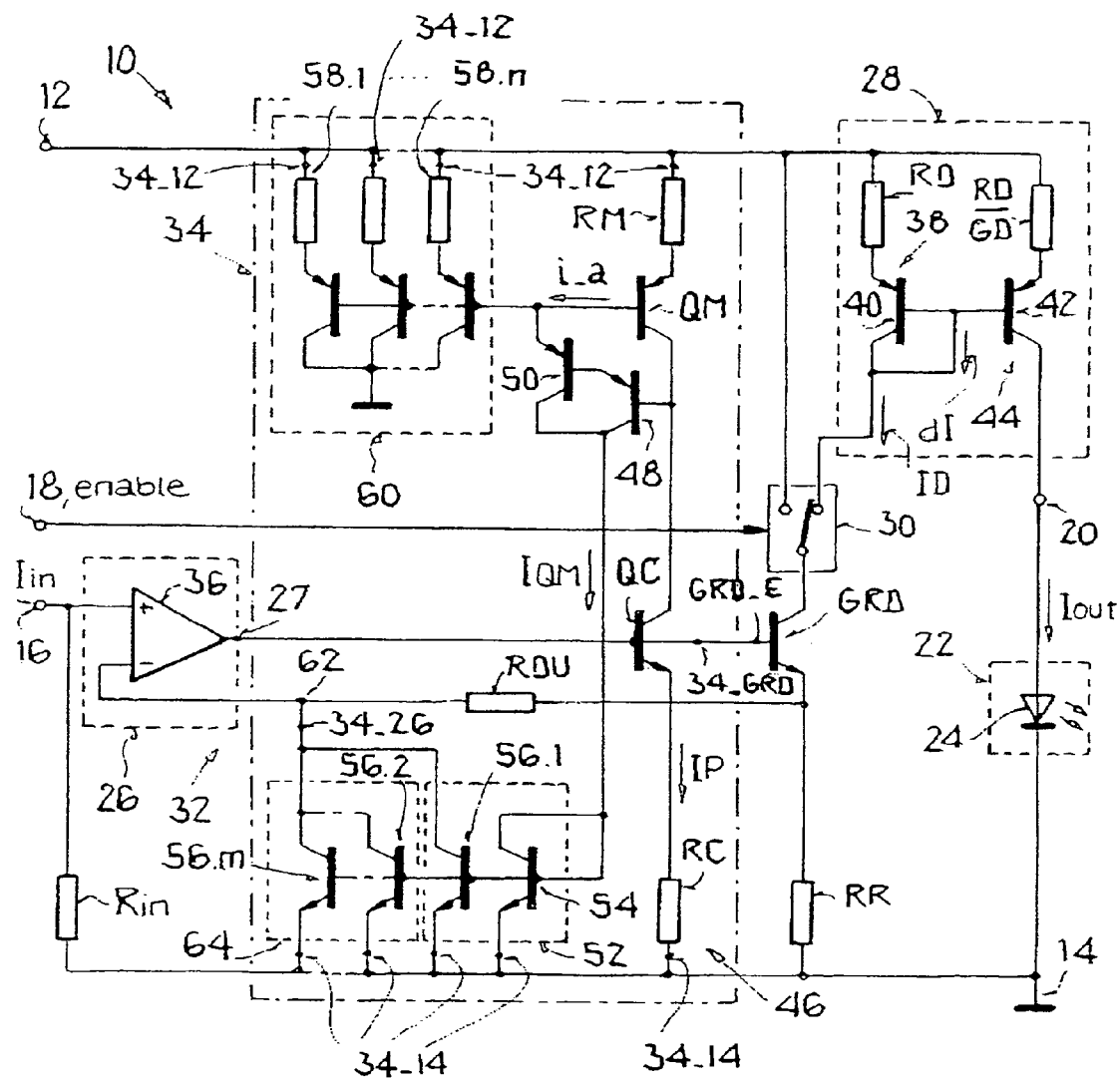
FIG. 5 illustrates a driver circuit with another concrete circuit embodiment of a compensating circuit.

FIG. 5 shows the driver circuit 10 from FIG. 1 with another concrete circuit embodiment of the compensating circuit 34. The compensating circuit 34 from FIG. 2 has a proportional branch 46 with a third transistor QC, a fourth transistor QM, a third emitter resistor RC of the third transistor QC and a fourth emitter resistor RM of the fourth transistor QM.

The third transistor QC, like the control current transistor GRD, is controlled by the output 27 of the amplifier 26. Therefore, the current IP flowing in the proportional branch 46 is proportional to the control current ID through the control branch 38 of the driver current mirror 28. In order to achieve the proportionality:

$$IP = \frac{1}{GC} \cdot ID.$$

The third transistor QC is dimensioned such that its emitter area is equal to the quotient of the emitter area of the control current transistor GRD in the numerator and the proportionality factor GC in the denominator. Analogously, the third emitter resistor RC must be dimensioned such that its resistance is substantially equal to GC times the emitter resistor RR.

The fourth transistor QM is of the same conductivity type as the first transistor 40 in the control branch 38 of the driver current mirror 28 and is dimensioned such that its emitter current density substantially corresponds to the emitter current density of the first transistor 40. In production of the driver circuit 10 as an integrated circuit, its gain Bpnp then also exhibits dispersions. However, these production-related dispersions generally only arise from circuit to circuit, and not within an individual circuit. In production of the driver circuit 10 as an integrated circuit, the first transistor 40 is manufactured together with the fourth transistor QM in a single process, so that both transistors 40, QM exhibit substantially equal variations in their current gain Bpnp. Since both transistors QM and 40 are connected as transistor diodes with equal emitter current density, the base current i_a of the fourth transistor QM is directly proportional to the error current dI arising in the driver current mirror 28.

Thus, the production of a correction signal KS that depends on the current gain Bpnp of the transistors 40, 42 of the driver current mirror 28 requires only the coupling-out of this base current i_a and the scaling of this base current i_a into a control signal IQM. In the subject of FIG. 4, the transistors 48 and 50 perform the coupling-out, hence the generation of the control signal IQM. In the compensating circuit 34 from FIG. 5, such a correction signal KS is produced by a correction current mirror 52 of a transistor diode 54 and at least one additional transistor 56.1, both of which are implemented as npn transistors. The current IQM fed into the correcting current mirror 52 from the base current of the fourth transistor QM is then given, with a factor K, by $$IQM = K \cdot \frac{ID}{GC \cdot Bpnp}$$

The factor K depends on the transistors 48, 50 and on optionally present additional current branches 58.1, ..., 58.*n* of a coupling factor circuit 60.

Under the condition that the correcting current mirror 52 scales the current IQM with a factor L, the correcting current mirror 52 draws L times the current IQM out of a node 62 in the feedback path 32, which corresponds to an additive combination/superposition (of a negative quantity). Via resistor RDU located in the feedback path 32, the L-th multiple of the current IQM gives rise to a corresponding correction voltage dU, to which the following applies:

$$dU = L \cdot IQM \cdot RDU = L \cdot K \cdot \frac{RDU \cdot ID}{GC \cdot Bpnp} = L \cdot K \frac{RC \cdot RDU \cdot ID}{RR \cdot Bpnp}$$

Through the feedback path 32, this dU gives rise to an additional control current dzI as a correction to the control current ID, which can be calculated as follows:

$$dzI = L \cdot K \frac{RC \cdot RDU \cdot ID}{RR \cdot RR \cdot Bpnp}$$

By choosing the factors L, K, it is possible to set dzI such that precisely the error current dI missing in the driver current mirror 28 is produced, so that this error current dI is compensated. Preferably, in order to keep the current consumption low, current multiplication will be accomplished using the correcting current mirror 52. To this end, the correcting current mirror 52 can be augmented with an L-factor circuit 64 that expands the correcting current mirror 52 with additional transistors 56.2, ..., 56.*n,* resulting in a multiplication of the current subtracted from the node 62 and thus to a corresponding adjustability for the factor L. For large values of L, the correcting current mirror 52 can be equipped with what is known as a β-helper, which is to say a Darlington circuit.

Insofar as has already been described, the driver circuit 10 is suitable, for example, for use as a laser diode driver for one channel. For pulse forming, it is possible to use additional channels whose output currents are added at a summing node arranged ahead of the laser diode 24. The current mirror 28 shown in FIGS. 1 and 4 has pnp transistors 40, 42 because the laser diodes 24 presently used are driven from the anode side, which is also known as high side control.

Figure 7:
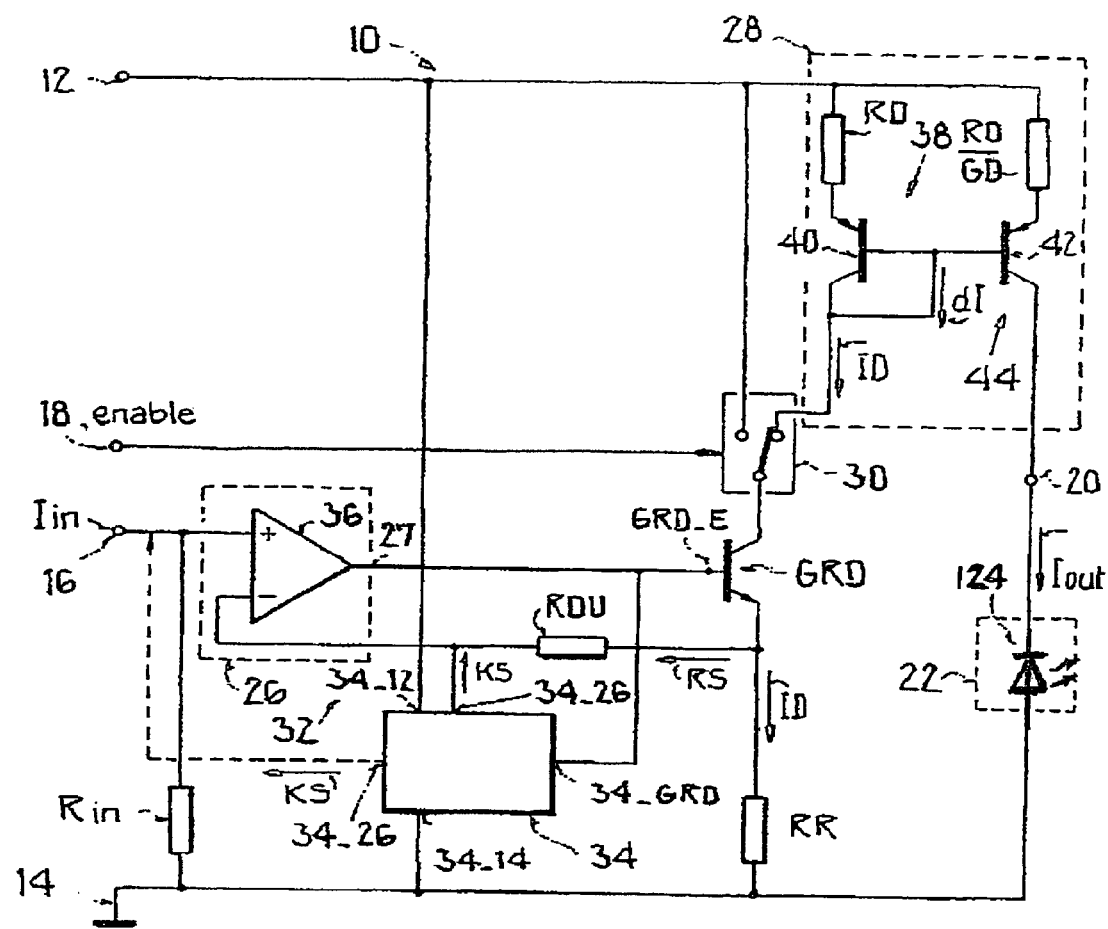
FIG. 7 illustrates another example embodiment of a driver circuit with a compensating circuit arranged according to an embodiment of the invention.

However, with an implementation of the current mirror 28 using npn transistors and the associated changes in the remaining circuit parts, for example a reversal of all polarities and conductivity types, the circuit can also be used for what is known as low side control, in which laser diodes are driven from the cathode side. FIG. 7 shows an exemplary aspect in which a laser diodes 124 is driven from the cathode side. It is also a matter of course that such high side driver circuits and low side driver circuits can also be operated together in a combined driver circuit.

Another alternative is that the current generated by the correction current mirror 52, if applicable after an inversion, can also be fed into the reference signal input of the amplifier 26.

Figure 6:
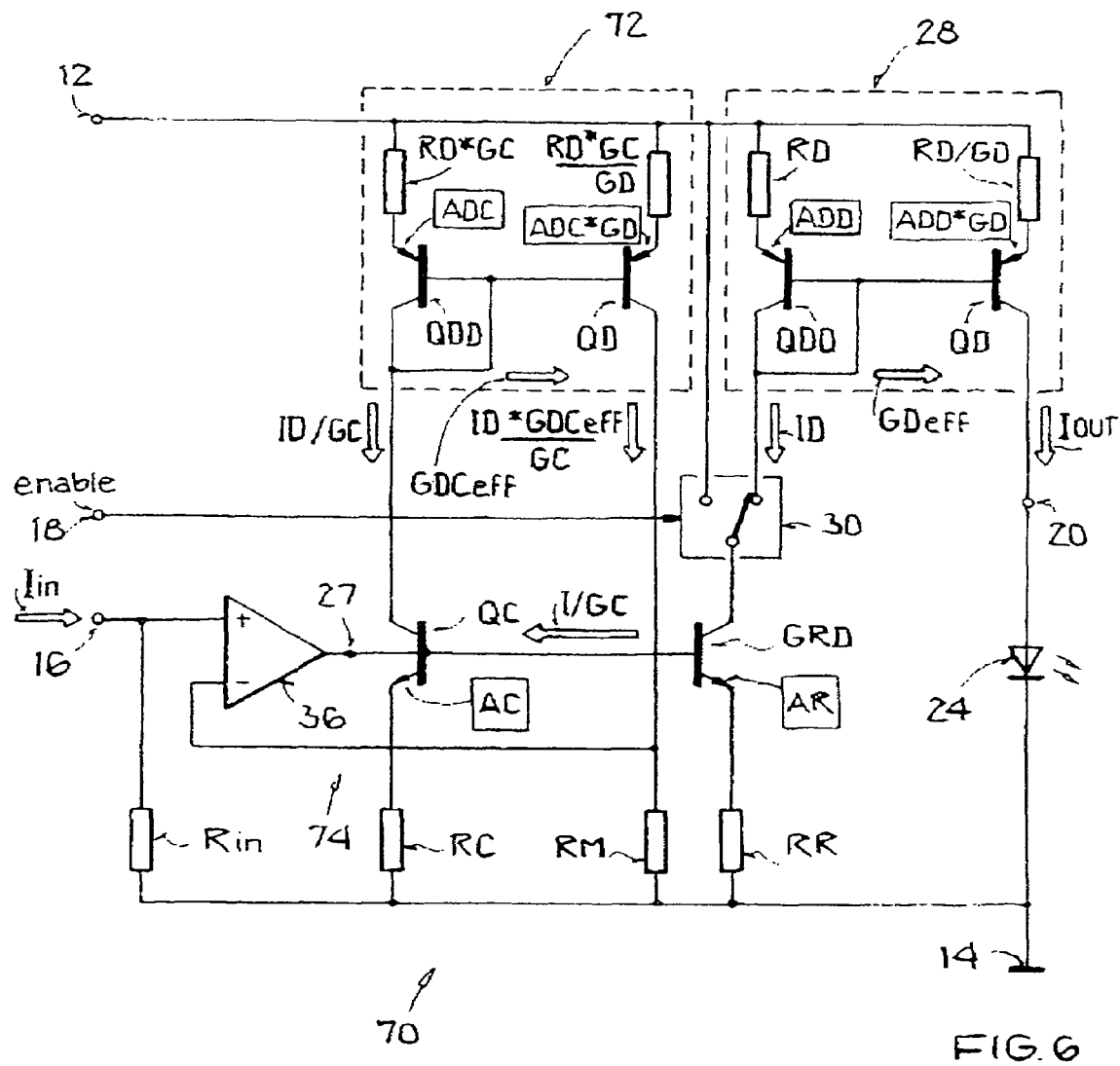
FIG. 6 illustrates a conventional driver circuit.

In order to illustrate the aforementioned advantages of the invention, FIG. 6 shows a conventional driver circuit, which has a compensating current mirror 72. In the case of the driver circuit 70, the compensating current mirror 72 is connected in a feedback path 74 of the amplifier 36 and is dimensioned such that it provides the same effective current gain as the driver current mirror 28. The current supplied by the compensating current mirror produces the same voltage drop at the resistor RM that the input current Iin produces at Rin. Under the aforementioned condition of equal effective current gain, the gain is then determined solely by resistor ratios. These can be set quite precisely in the monolithic integration. The symbols A . . . in FIG. 5 identify emitter areas. The arrows GDCeff, 1/GC and Gdeff indicate the direction and amount of a gain. The elements labeled R . . . correspond to resistor values. Otherwise, like numbers in FIGS. 1, 4 and 5 identify like elements.

A distinction from FIG. 4 is that the feedback signal is not coupled out of the control branch 38 of the driver current mirror, but instead is provided by the compensating current mirror 72. The compensating current mirror is thus traversed by the complete feedback signal and not only by a small offset. This leads to the aforementioned disadvantages of high current consumption and, in particular, a much higher noise component in the feedback signal as compared to the subject matter of FIGS. 1 and 4.

A comparison of FIGS. 1, 4 and 6, each of which shows embodiments of the invention, and the conventional art as is shown in FIG. 6, also results in the following two alternative formulations of embodiments of the invention:

Alternative I includes:

A driver circuit 10 for electronic components 22, with an amplifier 26 which generates a control signal ID from a reference signal Iin, with a driver current mirror 28, and with a control current switch 30, which is located between the amplifier 26 and the driver current mirror 28 and which selectably isolates the driver current mirror 28 from the amplifier 26 or connects the driver current mirror to the amplifier 26, wherein the driver current mirror 28, when in a state connected to the amplifier 26, amplifies the control signal ID into a driver signal Iout, and with a compensating circuit 34, which generates a correction signal KS as a function of an error current dI of the driver current mirror 28 and provides the correction signal to an input of the amplifier 26. A feedback signal input of the amplifier 26 is fed through a feedback path 32 from a feedback signal RS coupled out of a control branch 38 of the driver current mirror 28, and the compensating circuit 34 additively provides the correction signal KS at an input of the amplifier 26.

Alternative II includes:

A driver circuit 10 for electronic components 22, which has an amplifier 26, a driver current mirror 28 with a control branch 38 and a driver branch 42, and also has a compensating circuit 34, wherein the control branch 38 has a first transistor 40, which is connected in series with a second transistor QRD, and wherein the compensating circuit 34 compensates an error current dI of the driver current mirror 28 by a compensation signal KS. The driver circuit 10 has a proportional branch 46 with a third transistor QC and a fourth transistor QM, the third transistor QC is controlled together with the second transistor QRD by an output of the amplifier 26, elements RM, QM, RD, 40 of the driver circuit 10 are dimensioned such that equal current densities prevail in the first transistor 40 and the fourth transistor QM, and the compensating circuit 34 is supplied from a base current i_a of the fourth transistor QM, it generates the compensation signal KS as a signal proportional to the base current i_a, and it additively combines the compensation signal KS with a signal at an input of the amplifier 26.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A driver circuit for electronic components comprising:
    an amplifier;
    a control current transistor which generates a control signal from a reference signal;
    a driver current mirror;
    a control current switch, which is provided between the control current transistor and the driver current mirror, and which selectably isolates the driver current mirror from the control current transistor or connects the driver current mirror to the driver current transistor, the driver current mirror, when in a state connected to the control current transistor, amplifying the control signal into a driver signal; and
    a compensating circuit provided between an input of the control current transistor and an input of the amplifier, the compensating circuit permitting compensation of an error current and thereby of a current conversion error of the driver current mirror by generating a correction signal as a function of the error current of the driver current mirror and additively feeding the correction signal into the input of the amplifier.

2. The driver circuit according to claim 1, wherein a feedback signal input of the amplifier is fed through a feedback path from a feedback signal coupled out of a control branch of the driver current mirror.

3. The driver circuit according to claim 1, wherein a resistor is provided between an output of the control current transistor and a feed-in of the correction signal.

4. The driver circuit according to claim 1, wherein the driver current mirror has a control branch with a first transistor and a first emitter resistor, and also has a driver branch with a second transistor and a second emitter resistor,
    wherein GD is a conversion ratio, and
    wherein a value of the second emitter resistor corresponds to 1/(the conversion ratio GD) times of a value of the first emitter resistor, and an emitter area of the second transistor corresponds to the conversion ratio GD times of an emitter area of the first transistor.

5. The driver circuit according to claim 4, wherein the compensating circuit has a proportional branch comprising a third transistor, a fourth transistor, a third emitter resistor of the third transistor, and a fourth emitter resistor of the fourth transistor, and wherein an input of the third transistor is connected to an input of the control current transistor.

6. The driver circuit according to claim 1, wherein a feed-in of the correction signal is provided by an additive combination of the correction signal with the reference signal.

7. The driver circuit according to claim 1, wherein a feed-in of the correction signal is provided by an additive combination of the correction signal with a feedback signal.

8. The driver circuit according to claim 1, wherein the driver circuit drives at least one laser diode.

9. The driver circuit according to claim 8, wherein the laser diode is driven from a cathode side, the cathode side being a low side control.

10. The driver circuit according to claim 8, wherein the laser diode is driven from an anode side, the anode side being a high side control.

11. A driver circuit for electronic components comprising:
    an amplifier;
    a control current transistor which generates a control signal from a reference signal;
    a driver current mirror;
    a control current switch, which is provided between the control current transistor and the driver current mirror, and which selectably isolates the driver current mirror from the control current transistor or connects the driver current mirror to the driver current transistor, the driver current mirror, when in a state connected to the control current transistor, amplifying the control signal into a driver signal; and
    a compensating circuit provided between an input of the control current transistor and an input of the amplifier, the compensating circuit generating a correction signal and additively feeding the correction signal into the input of the amplifier
    wherein the driver current mirror has a control branch with a first transistor and a first emitter resistor, and also has a driver branch with a second transistor and a second emitter resistor,
    wherein GD is a conversion ratio,
    wherein a value of the second emitter resistor corresponds to 1/(the conversion ratio GD) times of a value of the first emitter resistor, and an emitter area of the second transistor corresponds to the conversion ratio GD times of an emitter area of the first transistor,
    wherein the compensating circuit has a proportional branch comprising a third transistor, a fourth transistor, a third emitter resistor of the third transistor, and a fourth emitter resistor of the fourth transistor, and wherein an input of the third transistor is connected to an input of the control current transistor, and
    wherein an emitter area of the third transistor is substantially equal to a quotient of an emitter area of the control current transistor in a numerator and a proportionality factor GC in a denominator, and wherein a value of the third emitter resistor is substantially equal to the proportionality factor GC times an emitter resistor which is connected in series between the control current transistor and a reference voltage connection.

12. The driver circuit according to claim 11, wherein the fourth transistor has substantially the same conductivity type as the first transistor in the control branch of the driver current mirror, and is dimensioned such that its emitter current density corresponds to an emitter current density of the first transistor.

13. The driver circuit according to claim 12, wherein the correction signal is provided by a controllable current source that is controlled by a base current of the fourth transistor.

14. The driver circuit according to claim 13, further comprising a correction current mirror of a transistor diode and at least one additional transistor as controllable current source.

15. The driver circuit according to claim 14, wherein the correction current mirror scales a current IQM coupled out of a base of the fourth transistor by a factor L and superimposes the current multiplied by the factor L on a feedback signal at a node in the feedback path as a correction signal.

* * * * *